(12) United States Patent
Ganesh et al.

(10) Patent No.: US 11,921,768 B1
(45) Date of Patent: Mar. 5, 2024

(54) ITERATIVE THEME DISCOVERY AND REFINEMENT IN TEXT

(71) Applicant: Amazon Technologies, Inc., Seattle, WA (US)

(72) Inventors: Bhavana Ganesh, Seattle, WA (US); Arushi Prakash, Seattle, WA (US); Banu Selin Tosun, Seattle, WA (US); Matthew Brorby, Redmond, WA (US); Naumaan Nayyar, Bellevue, WA (US); Hakan Karagul, Chicago, IL (US); Megan Noel Shaw, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 342 days.

(21) Appl. No.: 17/362,367

(22) Filed: Jun. 29, 2021

(51) Int. Cl.
| | |
|---|---|
| *G06F 16/35* | (2019.01) |
| *G06F 18/23213* | (2023.01) |
| *G06F 40/289* | (2020.01) |
| *G06F 40/30* | (2020.01) |
| *G06N 3/02* | (2006.01) |
| *G06N 20/00* | (2019.01) |

(52) U.S. Cl.
CPC ...... *G06F 16/358* (2019.01); *G06F 18/23213* (2023.01); *G06F 40/289* (2020.01); *G06F 40/30* (2020.01); *G06N 3/02* (2013.01); *G06N 20/00* (2019.01)

(58) Field of Classification Search
CPC .......... G06F 16/358; G06F 18/23213; G06F 40/289; G06F 40/30; G06F 16/313; G06F 16/3346; G06F 16/335; G06F 16/3334; G06F 16/951; G06F 40/216; G06F 17/30011; G06F 17/3053; G06N 3/02; G06N 20/00
See application file for complete search history.

(56) References Cited

U.S. PATENT DOCUMENTS

| | | | |
|---|---|---|---|
| 9,449,080 B1 * | 9/2016 | Zhang | G06F 16/3346 |
| 9,483,532 B1 * | 11/2016 | Zhang | G06F 16/24553 |
| 2013/0246430 A1 * | 9/2013 | Szucs | G06F 16/313 |
| | | | 707/738 |
| 2016/0110343 A1 * | 4/2016 | Kumar Rangarajan Sridhar | |
| | | | G06F 40/216 |
| | | | 704/9 |
| 2018/0032606 A1 * | 2/2018 | Tolman | G06F 16/93 |

* cited by examiner

*Primary Examiner* — Yogeshkumar Patel
(74) *Attorney, Agent, or Firm* — K&L Gates LLP

(57) ABSTRACT

Devices and techniques are generally described for iterative theme discovery in text. In some examples, first text data that is separated into a plurality of documents may be received. In some examples, a codebook comprising a first topic associated with a first set of keywords and a second topic associated with second set of keywords may be identified. Instructions to modify the codebook to generate a modified codebook may be received. The instructions may be effective to add to, delete from, and/or modify at least one of the keywords of the first set of keywords or the first topic. In some further examples, a first document of the plurality of documents may be tagged with the first topic based at least in part on the first keywords of the modified codebook. In some examples, output data may be generated that indicates that the first document pertains to the first topic.

20 Claims, 7 Drawing Sheets

Interface 702

Select an analysis method:
- ● Explore themes (no codebook needed)
- ○ Contextual Themes (i)
- ○ Theme Search (i)

Enter the number of themes to detect: [ 10 ]

Select a file for analysis: [ _____ ] [ Browse ]

Select a file for the codebook: [ Choose .csv file ] [ Browse ]

[ Submit ]

FIG. 7

ITERATIVE THEME DISCOVERY AND REFINEMENT IN TEXT

BACKGROUND

In machine learning and natural language processing, topic modeling is an unsupervised learning technique that detects words and/or phrases in a set of documents, and automatically clusters words and/or phrases that characterize the documents. A topic model is a statistical model used to determine abstract topics that occur in a collection of text documents. Topic modeling is sometimes used to determine hidden semantic features in a body of text. Topic modeling often determines a topic for a particular document based on a frequency with which words related to the topic appear within the document.

BRIEF DESCRIPTION OF DRAWINGS

FIG. 7 is an example graphical user interface that may be used in accordance with various techniques described herein for iterative theme discovery.

DETAILED DESCRIPTION

Figure 1:
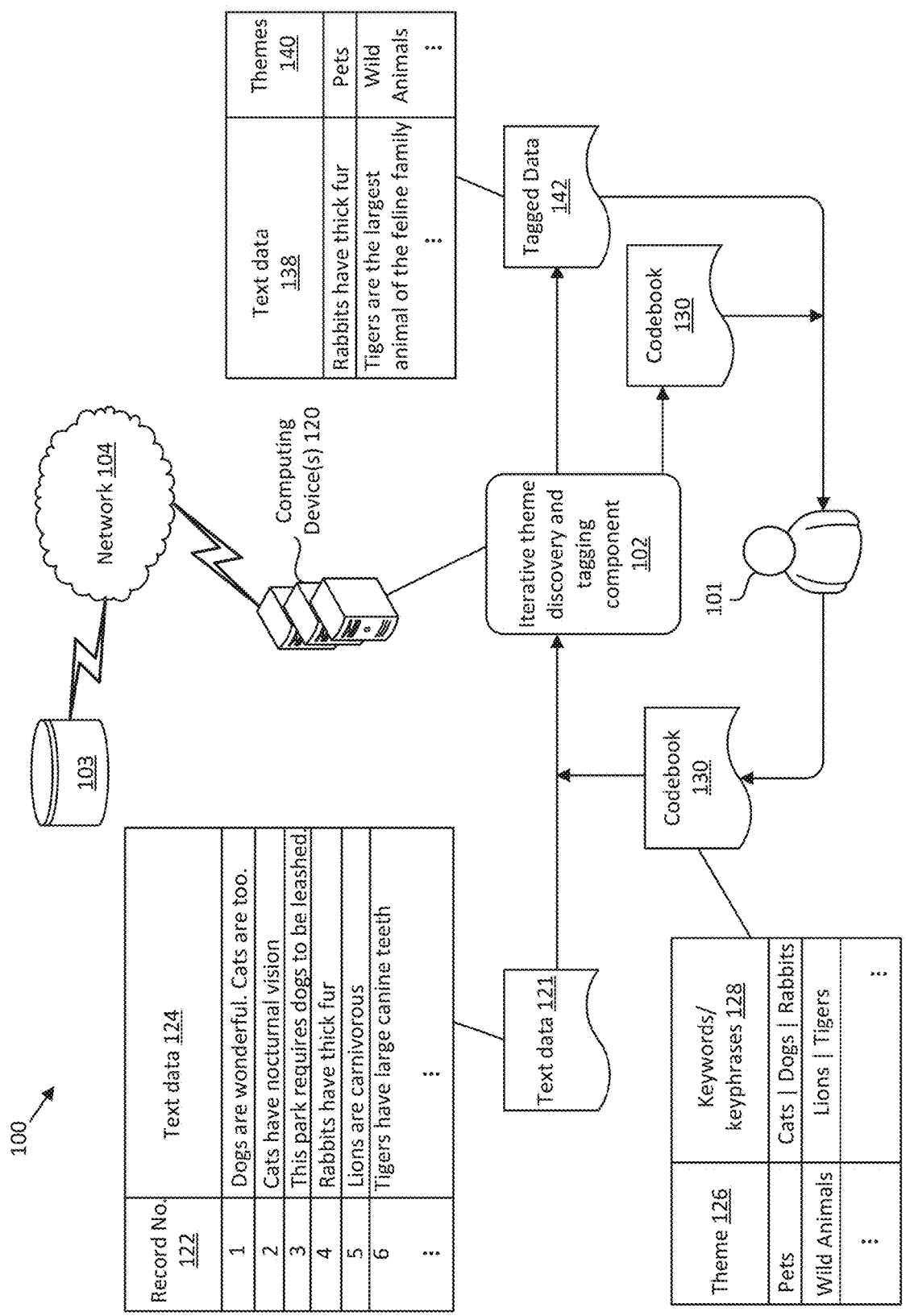
FIG. 1 is a diagram of a system effective to perform iterative theme discovery and refinement in text, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Topic modeling is often used in natural language processing to automatically determine one or more topics for a text document and/or group of text documents. In order to determine the topic, each document is used to generate a "bag of words" comprising a set of each unique word (and/or phrase) in the document and a frequency with which each unique word (and/or phrase) appears in the document. The bags of words may be used as input features to a machine learning model that may generate a topic model. The topic model may be used to predict one or more topics for input text.

Machine learning techniques, such as those described herein, are often used to form predictions, solve problems, recognize objects in image data for classification, etc. For example, machine learning techniques may be used to detect objects represented in image data and/or translate text from one spoken language to another. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learning models, such as neural networks, parameters control activations in neurons (or nodes) within layers of the machine learned models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models (e.g., transformer machine learning models) are machine learning models that include an encoder network and a decoder network. The encoder takes an input and generates feature representations (e.g., feature vectors, feature maps, etc.) of the input. The feature representation is then fed into a decoder that may generate an output based on the encodings. In natural language processing, transformer models take sequences of words as input. For example, a transformer may receive a sentence and/or a paragraph comprising a sequence of words as an input. Transformers use the attention mechanism to weigh the influence of different parts of the input data. Embeddings generated using transformer encoders may semantically represent a given word, phrase, and/or document in the context of the input corpus.

Qualitative researchers typically analyze text data from surveys, interviews, user feedback, product reviews, etc., in a manual fashion, where more than half the time is spent in reading and coding the data (e.g., tagging the data with metadata indicating themes present in the text). Such researchers and analysts may use insights from this data to develop new survey questions, explore trends in user experience, improve product design, remediate issues, and/or get feedback that may be used to improve products and/or enhance user experiences. While this text data is rich in information, it is difficult to analyze at scale, limiting the usefulness of the data. For example, researchers may need to first read all the text to identify themes in the text. The researchers may then need to re-read the text to tag the text with the identified themes. The process of reading and coding can be scaled using the various techniques described herein. In various examples, the iterative theme discovery and refinement techniques described herein process text data using natural language algorithms like unsupervised and weakly supervised topic modeling. Users can analyze their text data using a variety of available workflows. For data exploration, users can use unsupervised topic modeling to generate codebooks. For coding data and revising their codebooks, users can use the weakly supervised methods to tag input text data using the user-revised codebooks. A codebook lists topics and respective definitions for the listed topics. A topic definition comprises keywords/keyphrases that may assist users and/or a machine learning algorithm detect whether a topic is present in a given piece of text data.

To address the need for providing a scalable way to analyze data, described herein are various techniques that use Natural Language Processing (NLP) methods to analyze text data. In various examples, the iterative theme discovery and tagging component described herein provides an interface allowing users to upload their text data and analyze it in various ways. For example, users can discover and/or explore themes in their data—including for new text datasets that are unfamiliar. The tool can also be used to automatically generate codebooks from their text data, suitable for obtaining a seed codebook that can be improved with domain-expertise. Additionally, users are able to iteratively modify codebooks—whether the codebooks are generated using the techniques described herein or supplied by the user—and use the iteratively-modified codebooks to tag input text data with the most relevant themes. The codebooks may be iteratively modified for particular applications and/or based on expert-level domain knowledge of the text corpus. This tagged data can be used in downstream processes like selecting anecdotes from a theme or calculating the most prominent themes. The tool provides three ways to enable these workstreams—Explore Themes, Contextual Themes, and Theme Search.

FIG. 1 is a diagram of a system 100 effective to perform iterative theme discovery and refinement in text, in accordance with various aspects of the present disclosure. As depicted in FIG. 1, computing device(s) 120 may include one or more computer-readable memories 103 and/or may be configured in communication with non-transitory computer-readable memories 103, such as over network 104. In various examples, network 104 may represent a local area network (LAN) and/or a wide area network (WAN) such as the internet. In various examples, the one or more computer-readable memories 103 may store non-transitory computer-readable instructions that, when executed by one or more processors of the computing device(s) 120, may be effective to program the one or more processors to perform the various iterative theme discovery and tagging techniques described herein.

Computing device(s) 120 may be effective to implement the iterative theme discovery and tagging component 102. In a first iteration, the iterative theme discovery and tagging component may generate a codebook on the basis of a corpus of text data (e.g., text data 121). Text data 121 may include a plurality of documents (e.g., records). In various examples, each document may be associated with a record number 122 and text data 124. For example, document 1 may comprise the text, "Dogs are wonderful. Cats are too." Similarly, document 2 may comprise the text, "Cats have nocturnal vision." The iterative theme discovery and tagging component 102 may employ the Explore Themes techniques described below to generate a codebook that groups together themes discovered in the input text data (e.g., text data 121) using the various techniques described below. As discussed in further detail below, a codebook may include themes (e.g., topics) and, for each theme, one or more keywords/keyphrases 128 associated with that theme. In general, in the description herein, the terms keywords/keyphrases are used interchangeably, so the term "keyword" may encompass both a single word or a series of words. Keywords/keyphrases 128 are the words/phrases of the input text data (e.g., text data 121) that have been determined by the Explore Themes techniques to pertain to a particular theme/topic.

Iterative theme discovery and tagging component 102 may parse input text data (e.g., text data 121) to discover themes and/or automatically generate a codebook for the input text data using the various techniques described below. Using input (e.g., user-provided) text data, the Explore Themes feature uses a combination of algorithms to first, generate topics of the input text, and then tag the text data with the most relevant topics amongst those generated in the first step. This feature is a combination of keyphrase extractor and topic modeler.

Candidate keywords/keyphrases may be extracted from text data using a variety of pre-processing techniques. For example, noun phrases that meet the following conditions may be retained—(1) noun phrase includes less than five words, (2) does not start with a determiner, pronoun, adjective, or number, (3) ends in a noun, and (4) does not start with a pre-defined stop word. In another example, phrases that occur in more than a threshold percentage (e.g., 50%) of the text documents may be removed since such phrases may not be very informative for topic modeling, and instead may add noise similar to stop words.

The resulting list of candidate keyphrases (e.g., candidate phrases) may be embedded using a transformer-based language model (e.g., BERT) or using any other type of language model (e.g., non-transformer based language models). Additionally, each document may be embedded using the same language model. In an example, the BERT model used in some of the examples described herein may include 12-layers, 768-hidden, 12-heads, and 110 M parameters although any other instantiation and/or language model may be used. Embeddings from the last layer are used to embed the candidate keyphrases and the documents.

A score may be computed for each of the keyphrases according to the local (local cosine distance between the candidate keyphrase embedding and the embedding of the document from which the candidate keyphrase was extracted) and global (global cosine distance defined as the average cosine distance between the candidate keyphrase embedding and all documents) semantic scores:

$$\text{Score} = \cos(v_i, d_j) \cdot 1/k \Sigma_k \cos(v_i, d_j)$$

where $v_i$ and $d_j$ are vector embeddings for the keyphrase and document, respectively.

The top N candidate keyphrases (e.g., N=500 or any other desired value) having the highest scores may be selected for topic modeling. These N keyphrases may be clustered into M topics using the K-means clustering algorithm (or another clustering algorithm) on their embeddings. The number M of topics may be pre-defined or provided by a user. A codebook may be generated which includes the keyphrases associated with each of the M topics. Codebook 130 in FIG. 1 is an example of such a codebook. Note, however, that in the first iteration, the topics may not include human-readable names such as "pets", etc. Instead, the topics are defined by their keywords (and possibly by numbering and/or other identifier data).

The text corpus is tagged with their K nearest topics by finding the topics closest to them, based on the cosine distance between the text and topic center. For example, the average embedding of the keyphrases associated with a particular topic may be the topic center. The closest K topic center(s), in the embedding space, to the embedding of the text being tagged may be selected and used to tag that text. An example of a tagged corpus of text data is tagged data 142 in FIG. 1.

In various cases, a user 101 having domain expertise for the relevant corpus of text data may modify the codebook (whether generated using Explore Themes or user-supplied). For example, if the Explore Themes techniques are used, the topics may not be named using human-readable category/topic names. Accordingly, user 101 may name the various themes 126. For example, codebook 130 includes themes 126 with human-readable names such as "Pets," "Wild Animals," etc. Additionally, the user 101 may modify keywords/keyphrases 128 by adding additional keywords, deleting keywords, modifying keywords, subdividing a topic into sub-topics with associated keywords, deleting topics, adding additional topics, etc. The modified codebook (or a user-provided codebook) 130 may be used to tag text data 121, after refinement by the user 101. The user 101 may continue to iteratively modify the codebook as desired for a particular application and/or particular corpus of text. The techniques for refining the iterative theme discovery and tagging component 102 using the modified codebook 130 (or a user-supplied codebook) are described below in reference to FIG. 2 in the "Contextual Themes" section.

Once iterative theme discovery and tagging component 102 has tagged the input text data 121 using the modified and/or user-supplied codebook 130 the tagged data 142 may be output. Tagged data 142 may include text data 138 (e.g., the text of a document) and the theme/topic tags (e.g., themes 140). For example, the text data 138 "Rabbits have thick fur" may be tagged with the theme 140 "Pets" by the iterative theme discovery and tagging component 102. Similarly, the text data 138 "Tigers are the largest animal of the feline family" may be tagged with the theme 140 "Wild Animals" by the iterative theme discovery and tagging component 102 using the codebook 130.

Figure 2:
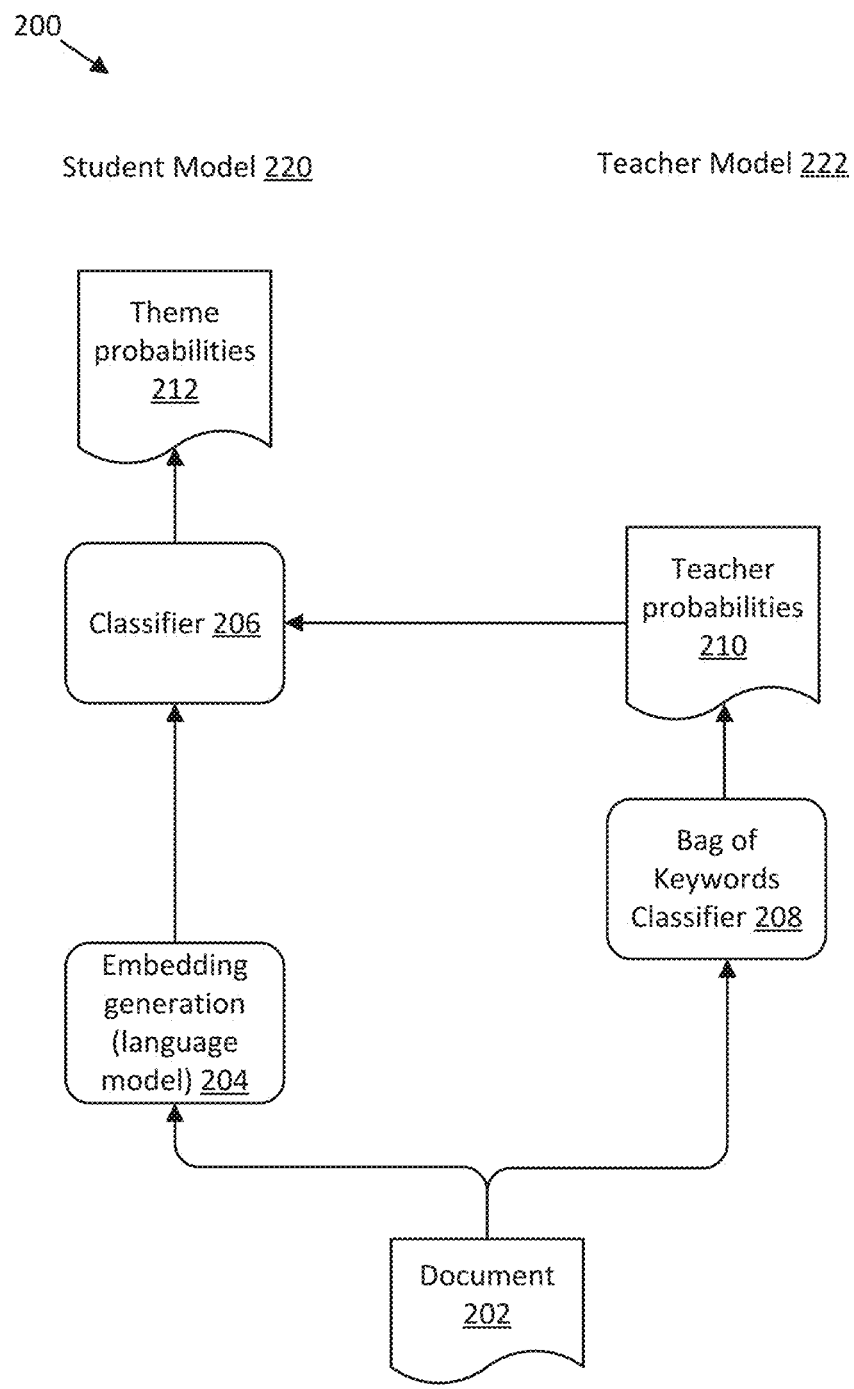
FIG. 2 depicts a diagram of a student-teacher machine learning architecture effective to learn from user provided codebooks to tag text data, in accordance with various embodiments of the present disclosure.

FIG. 2 depicts a diagram of system 200 comprising a student-teacher machine learning architecture effective to learn from codebooks to tag text data, in accordance with various embodiments of the present disclosure. In various examples, the student-teacher machine learning architecture may provide tagging of input text data by user-provided codebooks and/or user-modified codebooks that were automatically generated using the various techniques described herein.

The contextual themes feature allows users to use their own codebooks and/or modified versions of Explore Themes-generated codebooks to automatically tag text data. Advantageously, not only does the contextual themes feature allow users to use their own custom codebooks (e.g., manually-generated codebooks), but the users are able to test multiple hypotheses using multiple versions of their codebook to refine the codebook and/or answer different questions from the text data. Additionally, the codebooks may be initially generated by the Explore Themes techniques described herein and subsequently iteratively modified by the user, as desired.

Weakly supervised approaches use minimal domain knowledge or ground truth labels to train machine learning models. In the settings discussed herein, domain knowledge is given by the codebooks as a set of keywords/keyphrases for each theme of interest. Jagarlamudi et al., 2012 ("Incorporating Lexical Priors into Topic Models")proposes a GuidedLDA model that uses latent Dirichlet allocation (LDA) using collapsed Gibbs sampling. The keyword set makes the topics converge in that direction. Gallagher et al., 2017 ("Anchored Correlation Explanation: Topic Modeling with Minimal Domain Knowledge") proposes a Correlation Explanation (CorEx) model, as an alternative approach to topic modeling that does not assume an underlying generative model, and instead learns maximally informative topics through an information theoretic framework. Some previous topic-modeling approaches use latent Dirichlet allocation and/or information theoretic frameworks. However, such models do not leverage the power of language models but rather rely heavily on words themselves and their frequencies. These approaches also require large datasets to be able to generalize beyond the keywords/keyphrases provided.

FIG. 2 depicts an architecture for tagging text data that uses a weakly supervised machine learning framework to learn from user-provided codebooks, and uses the learnings to tag text data with themes. The system 200 is a student-teacher architecture (comprising student model 220 and teacher model 222), where the teacher model 222 uses only the keywords/keyphrases provided by the user to assign theme probabilities. By contrast, the student model 220 may be implemented as a neural network (e.g., a transformer-based language model such as BERT) that learns the topic context from the "soft" predictions by the teacher model 222 using knowledge distillation.

Knowledge distillation typically includes transferring "knowledge" from one machine learning model to another using both ground truth labels and the soft predictions of the teacher using a distillation objective. The goal of knowledge transfer is to generate a student model that achieves better accuracy by virtue of knowledge transfer from the teacher model than if the student model were to be trained directly. The system 200 also uses a student-teacher architecture and the distillation objective. However, the student model 220 and teacher model 222 learns the text tagging task in a considerably different, weakly supervised setting. For example, the system 200 does not use any labels for training, and conditions are generated that allow the student model 220 to outperform the teacher model 222.

In an example, there may be a corpus of text data for tagging with K pre-defined themes of interest $(1, \ldots, K)$. In some cases, one of the themes may be a "General" aspect (e.g., the $K^{th}$ theme). The pre-defined codebook may include keywords $G_k$ for each theme $k \in [K]$. The goal is to use the text data and the available keywords $G=(G_1, \ldots, G_K)$ to train a classifier, which can predict K theme probabilities $p=<p_1, \ldots, p_K>$ for each document 202 of the text data.

Student-Teacher Approach

The system 200 is a student-teacher architecture where the teacher model 222 may be a bag-of-words classifier trained on the provided key words (e.g., a "bag-of-keywords" classifier 208), and the student model 220 may be an embedding-based neural network (e.g., BERT) trained on data "softly" labeled by the teacher model 222 (as in the distillation objective).

The teacher model 222 leverages the keywords G that are predictive of the K themes in the codebook. If D is the total number of keywords in G, each document 202 in the text data is encoded to represent the keywords present. The representation of document $s_i$ using the bag-of-keywords representation is $c_i \in \mathbb{N}^D$, where $c_i^j$ denotes the number of times the jth keyword occurs in the document. This representation ignores the terms that do not appear as keywords.

The teacher model 222's prediction for the $k^{th}$ aspect is:

$$q_i^k = \frac{\exp\left(\sum_{j=1}^{D} I\{j \in G_k\} \cdot c_i^j\right)}{\sum_{k'} \exp\left(\sum_{j=1}^{D} I\{j \in G_k\} \cdot c_i^j\right)}$$

If no seed word appears in s, then the teacher may predict the "General" aspect by setting $q_i^k=1$. Under this configuration the teacher model 222 uses seed words in a direct and intuitive way: it predicts aspect probabilities (e.g., teacher probabilities 210) for the k-th aspect, which are proportional to the counts of the seed words under Gk, while if no seed word occurs in s, the teacher model 222 predicts the "General" aspect. The bag of keywords classifier 208 receives ci as input and predicts $q_i^k = <q_i^1, \ldots, q_i^k>$.

The student model 220 is an embedding-based neural network model where text data is encoded in numerical form using embeddings generated by a language model, such as BERT (e.g., embedding generation component 204) and then used to classify to the different themes by a neural network-based classifier 206. That is, the text data is first embedded ($h_i=\text{EMB}(s_i) \in R^d$) by embedding generation component 204 and then classified by classifier 206 to the K themes ($p_i=\text{CLF}(h_i)$). The student model does not use any ground-truth labels for training. Instead, the neural network architecture of the student model 220 is trained by optimizing the distillation objective. For example, the cross entropy between the teacher model 222's (soft) predictions and the student model 220's predictions (theme probabilities 212) is optimized by:

$$H(q_i, p_i) = -\Sigma_k q_i^k \log p_i^k$$

While the teacher model 222 only uses the keywords in $s_i$ to form its prediction qi, the student model 220 uses all the words in $s_i$. Thus, using the distillation loss for training, the student model 220 learns to use both keywords and non-keywords to predict aspects (e.g., theme probabilities 212).

As a result, the student model 220 is able to generalize better than the teacher model 222 and can predict aspects even in segments that do not contain any seed words. To regularize the student model, L2 regularization may be applied to the classifier 206's weights.

Figure 3:
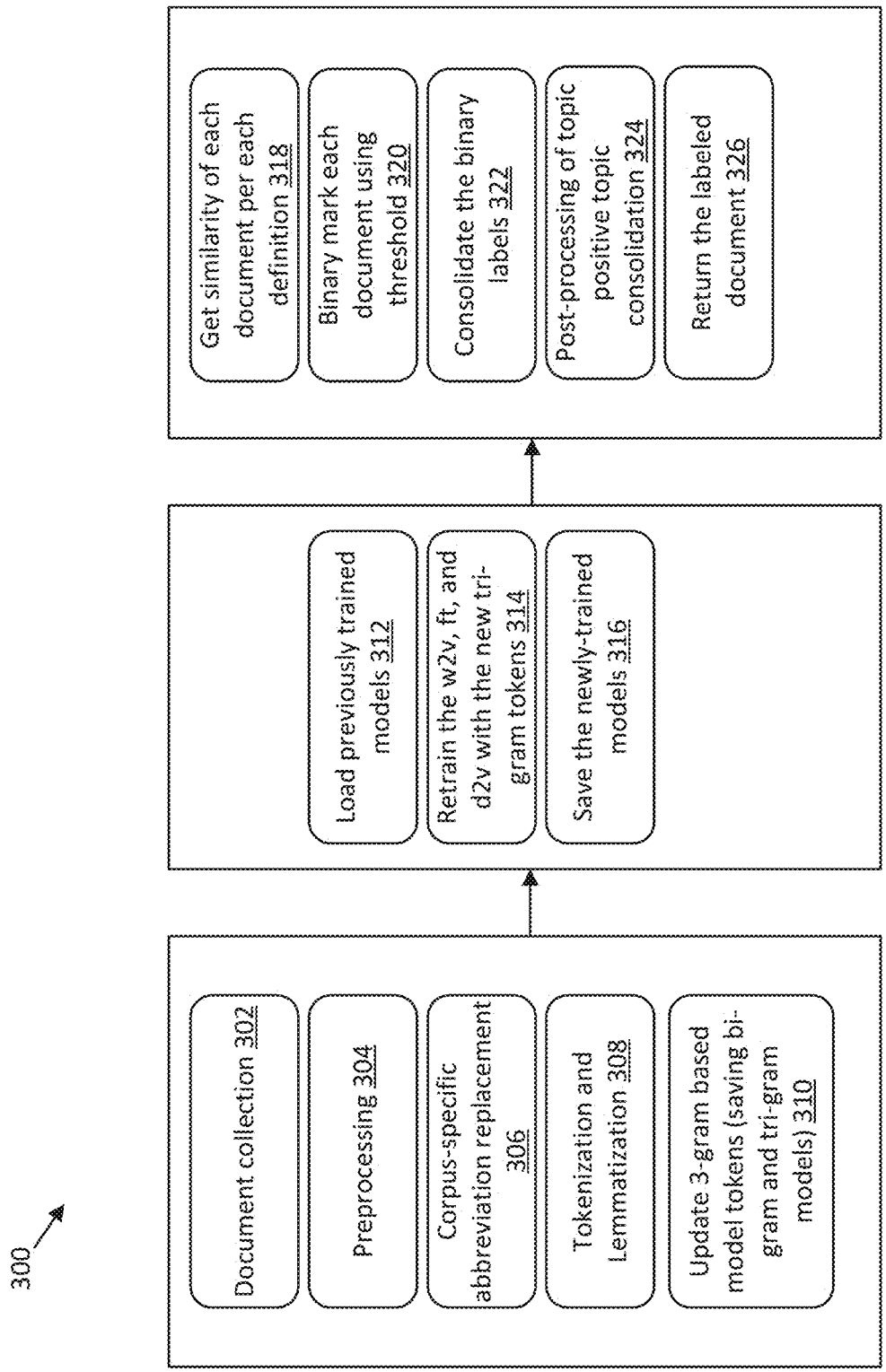
FIG. 3 depicts an example flow diagram effective to perform tagging for an input text corpus by retraining the machine learning models on the input text corpus, in accordance with various aspects of the present disclosure.

FIG. 3 depicts an example flow diagram represents an algorithm 300 effective to perform a Theme Search algorithm that is effective to tag an input text corpus by retraining the machine learning models on the input text corpus, in accordance with various aspects of the present disclosure. The algorithm 300 is effective to tag themes in an input text corpus using either a user-supplied codebook or a codebook generated using the Explore Themes techniques described herein. In a fully-formed codebook (whether user-supplied or automatically generated), where each topic is defined with a set of keywords/keyphrases, the algorithm 300 takes the documents as inputs (document collection 302) and runs the documents through specialized pre-processing steps 304. The algorithm performs corpus-specific abbreviation replacement 306 according to the desired logic. The algorithm later re-trains the machine learning models, updating the word and document embeddings by taking the new text to be explored into account. Using these updated word and document embeddings, the algorithm marks each document to a given topic by measuring the similarity with the defined keywords/keyphrases in the codebook. Additionally, the algorithm accounts for the similarity between documents/document text and the contextual synonyms of the keywords/keyphrases of the codebook. Comparing the Theme Search algorithm to the more complex Regex algorithm, the flagged observations are correctly labelled 4 times more often using the algorithm depicted in FIG. 3.

Similar to search engines, a similarity score is used for conducting a semantic search. However, instead of using classical item-item similarity or TF-iDF (term frequency-inverse document frequency) methodologies like search engines, Neural Network (NN) based embeddings of each word and document are used due to performance gains. TF-iDF is a term frequency-inverse document frequency methodology that calculates the frequencies of each observed word in a given document, and compares the frequency of a given word with the uniqueness of this word. Word2Vec creates a vector space with a NN system to represent word embeddings that take into account the other words used before and after the word of interest.

The Theme Search algorithm 300 uses contextual synonym generation, word and document level embeddings, and returns results above a threshold value that is calculated using cosine similarity.

The predictive power of machine learning models, like natural language processing (NLP) models, is strongly related to the pre-processing 304 steps that are used. In NLP, this can translate to various pre-processes, such as removal of corpus related abbreviations (corpus-specific abbreviation replacement 306), spelling correction, removal of non-English documents (if the model is for use with English text). In addition, stop word removal, tokenization and lemmatization 308, and n-gram formation 310 may be used. To sustain an overall standardization of the abbreviations in the text, the abbreviations may be replaced with their open forms. For detecting whether the document is in English or not, a pre-trained FastText model or other language model may be used. The FastText model marks the document based on the words. If more than 50% of the words in the document are non-English then the document is marked as non-English. This may be useful when dealing with very short documents in customer surveys. For example, the survey's text may state only "Mac" which is only a proper noun. This does not provide enough context to the models to interpret the form. In algorithm 300, the n-gram formation may be limited to 3-grams. The effectiveness of the n-gram (combination of n words that repeats frequently to form a phrase) formation drops exponentially, and the drop in entropy is almost zero after 5-gram formations.

Algorithm 300 marks the samples with respect to the given keywords. However, since the model classifies texts into topics given in the codebook, the generic classification metrics may be used to evaluate the model performance. However, there are a few key distinctions from the generic classification. First, the previously trained models (e.g., word2vec, FastText (from Gensim library) doc-2-vec (d2v) (from Gensim library), etc.) are loaded into memory (action 312). The preprocessed data may be used to re-train the previously trained models, the word and document embeddings are updated with the new corpus (action 314). The newly-trained models (now trained on the input corpus) are saved at action 316. The word and document embeddings are used to calculated the cosine similarity between the words and documents (action 318), and labels are created as binary values when this cosine similarity is above a certain threshold value (action 320). At action 318, a determination is made whether a topic's definition (e.g., a list of keywords/keyphrases for a given topic) or the topic's contextual synonyms are present in a given document and whether the document embedding and the definition embedding's cosine similarity is above the threshold value. The two different (per-definition) binary labels may be consolidated (action 322) and post-processing of topic positive topic consolidation may be performed (action 324). When there is more than one definition per topic, all definitions may be evaluated and the topic may be tagged as present. Finally, all present topics may be marked as the output for the document. If none of the topics are found then the document may be marked as "No Tag" or similar. The tagged document (and/or a data structure including a per-document list of tags) may thereafter be returned to the requesting user (action 326).

The features to classify the labels may be based on the codebook (e.g., keywords/keyphrases) and the (re)trained model. Since online training is being used, word and document embeddings may be updated with the frequencies observed in the newly-introduced corpus. Hence the output quality is significantly dependent on the quality and the quantity of the provided topic definitions.

Figure 4:
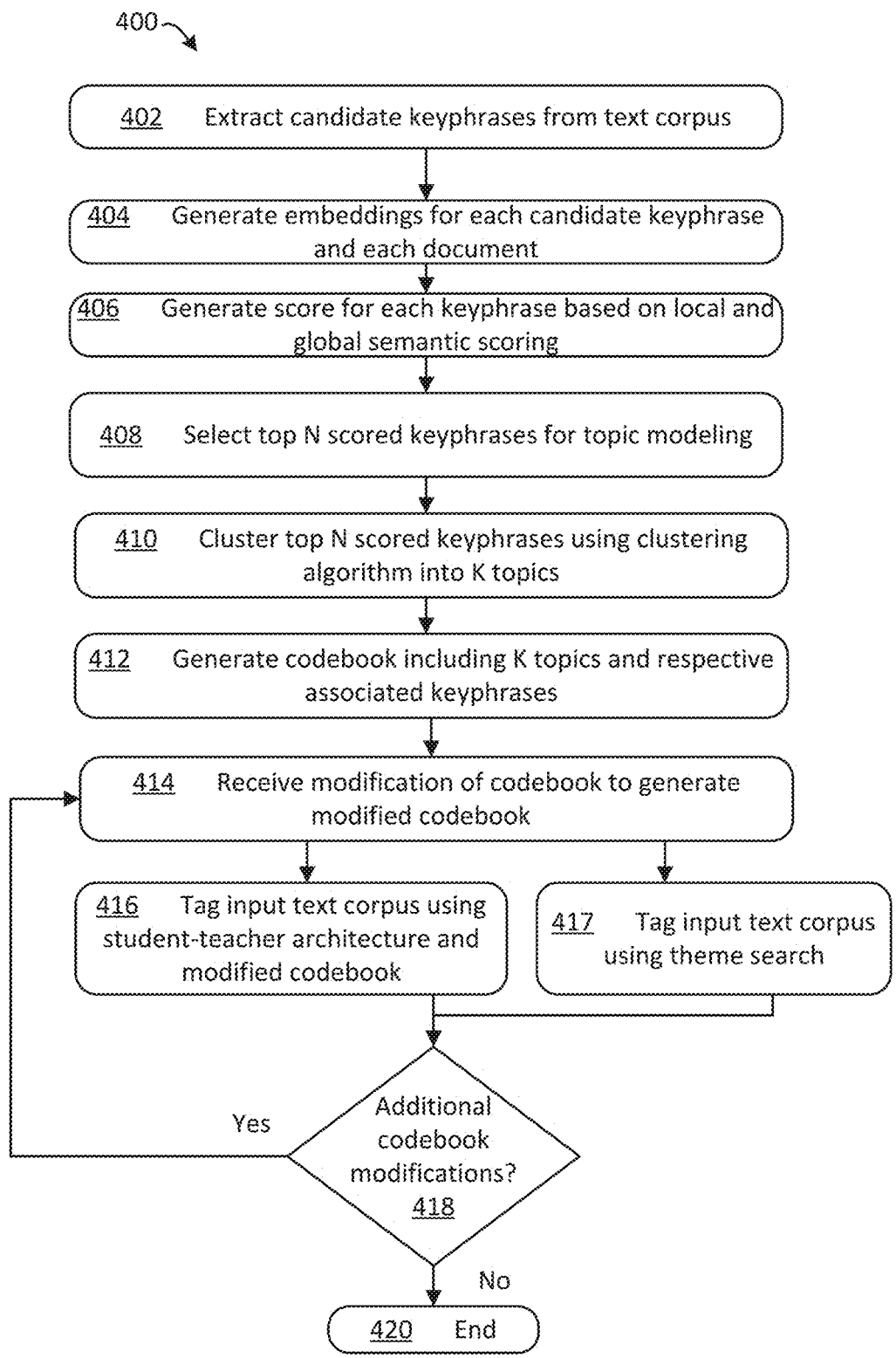
FIG. 4 depicts a flow chart showing an example process for iterative theme discovery and refinement in text, in accordance with various aspects of the present disclosure.

FIG. 4 depicts a flow chart showing an example process 400 for iterative theme discovery and refinement in text, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 of FIG. 4 may begin at action 402, at which candidate keyphrases may be extracted from the text corpus. For example, phrases and/or sentences that include nouns may be extracted. In various examples, noun phrases that exceed a predefined number of words may be excluded. Various other preprocessing may be performed to determine the candidate keyphrases. For example, noun phrases that start with a determiner, pronoun, adjective, or number may be excluded. Noun phrases that do not end in a noun may be excluded. Noun phrases that start with a pre-defined stop word may be excluded. In some further examples, noun phrases that occur in more of 50% of the documents in a text corpus may be excluded.

After these and/or other preprocessing steps, the final list of candidate keyphrases may be subjected to further processing at action 404, at which embeddings may be generated for each of the candidate keyphrases and for each document. The embeddings may be generated using a language model (e.g., BERT) and/or another neural network.

Processing may continue to action 406, at which a score may be generated for each keyphrase based on local and global semantic scoring. For example, as described above, the score may be computed for each of the candidate keyphrases according to the local (cosine distance between the candidate keyphrase embedding and the embedding of the document from which the candidate keyphrase was extracted) and global (average cosine distance between the candidate keyphrase embedding and all documents) semantic scores:

$$\text{Score} = \cos(v_i, d_j) \cdot 1/k \Sigma_k \cos(v_i, d_j)$$

where $v_i$ and $d_j$ are vector embeddings for the keyphrase and document, respectively.

Processing may continue to action 408, at which the top N scored keyphrases may be selected for topic modeling. N may be any suitably large number. For example, N may be 500, 600, 405, etc. Once determining the top N scored keyphrases, processing may proceed to action 410, at which the embeddings for the top N scored keyphrases may be clustered using a clustering algorithm (e.g., K-means clustering). Each resulting cluster may represent a topic (e.g., a theme) that is present in the input text corpus.

Processing may continue at action 412, at which a codebook may be generated that includes K topics and respective definitions for each of the topics. As used herein, the definition of a topic includes the keywords/keyphrases for the topic. In the current example, the keywords/keyphrases are those with embeddings that are clustered together at action 410 into a single cluster (e.g., a topic cluster). The codebook may include topic identifiers (e.g., topic numbers and/or other identifier data that may be used as computer-readable identifiers for the topics) and the topic-defining keywords/keyphrases.

Processing may continue at action 414, at which a modification of the codebook may be received. The modification may take a variety of forms. For example, the topic definition may be modified by adding, deleting, and/or modifying keywords/keyphrases. Additionally, topics may be split into one or more sub-topics and keywords/keyphrases may be defined for the sub-topics. New topics and topic definitions may be added. Topics may be removed. Topics may be re-named (e.g., with human-readable topic names).

Processing may continue at action 416, at which an input text corpus may be tagged with topics using the student-teacher architecture of FIG. 2 and the modified codebook. For example, the student model 220 may generate per-document theme probabilities 212 that includes, for each document of the input text corpus, a probability for each theme of the modified codebook. Optionally, instead of proceeding from action 414 to action 416, processing may instead proceed from action 414 to action 417, at which the theme search techniques described above in reference to FIG. 3 may be used to tag an input text corpus using models retrained on the specific input text corpus.

At action 418, a determination may be made whether there are further codebook modifications. For example, a user with domain expertise may further modify the codebook to improve tagging and/or for a different data analysis task. If a modification is made to the codebook, processing may return to action 414 and the modification may be used to modify the current codebook. Thereafter, the input text corpus may again be tagged with the newly-modified codebook using the student-teacher architecture. The student-teacher architecture may be trained using the newly-modified codebook prior to tagging, as described above in reference to FIG. 2. If, at action 418, there are no additional codebook modifications, processing may conclude at action 420 (end).

Figure 5:
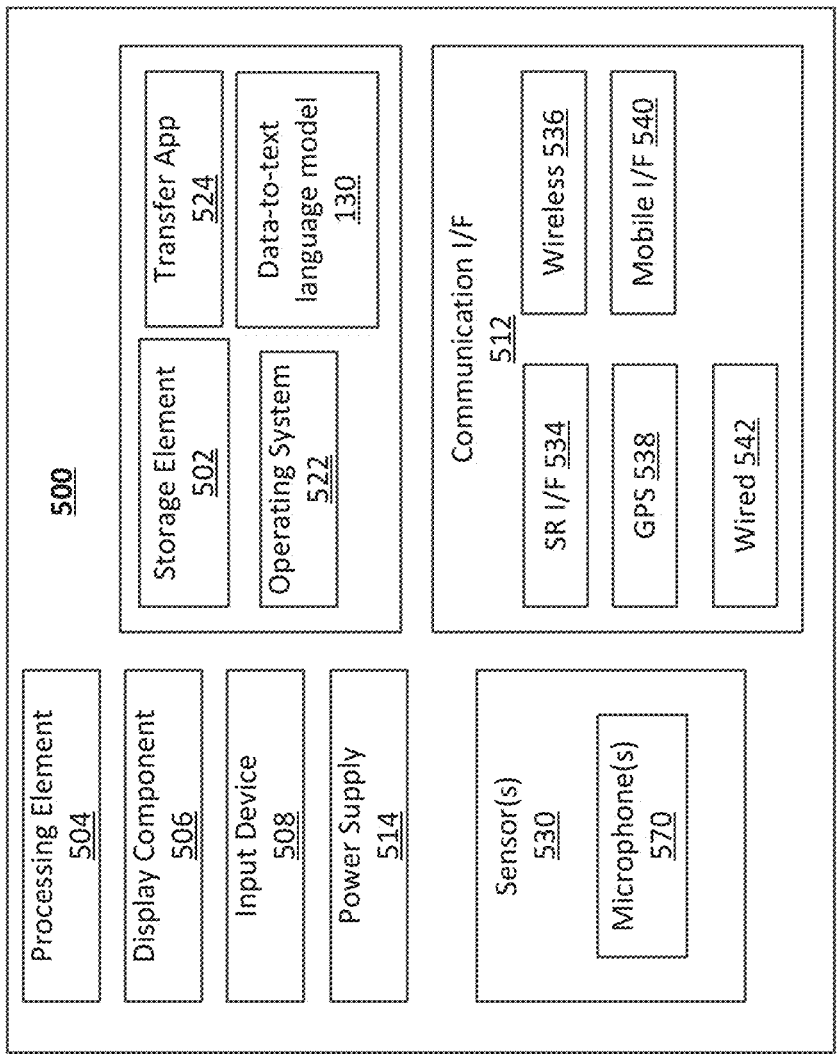
FIG. 5 is a block diagrams showing an example architecture of a computing device that may be used in accordance with various embodiments described herein.

FIG. 5 is a block diagram showing an example architecture 500 of a computing device that may be used to implement (at least in part) item filtering for a recipe interface, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, search indexes, programs, etc., that may be used to map recipe ingredients to canonical ingredients and/or to food items for sale via an e-commerce service.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
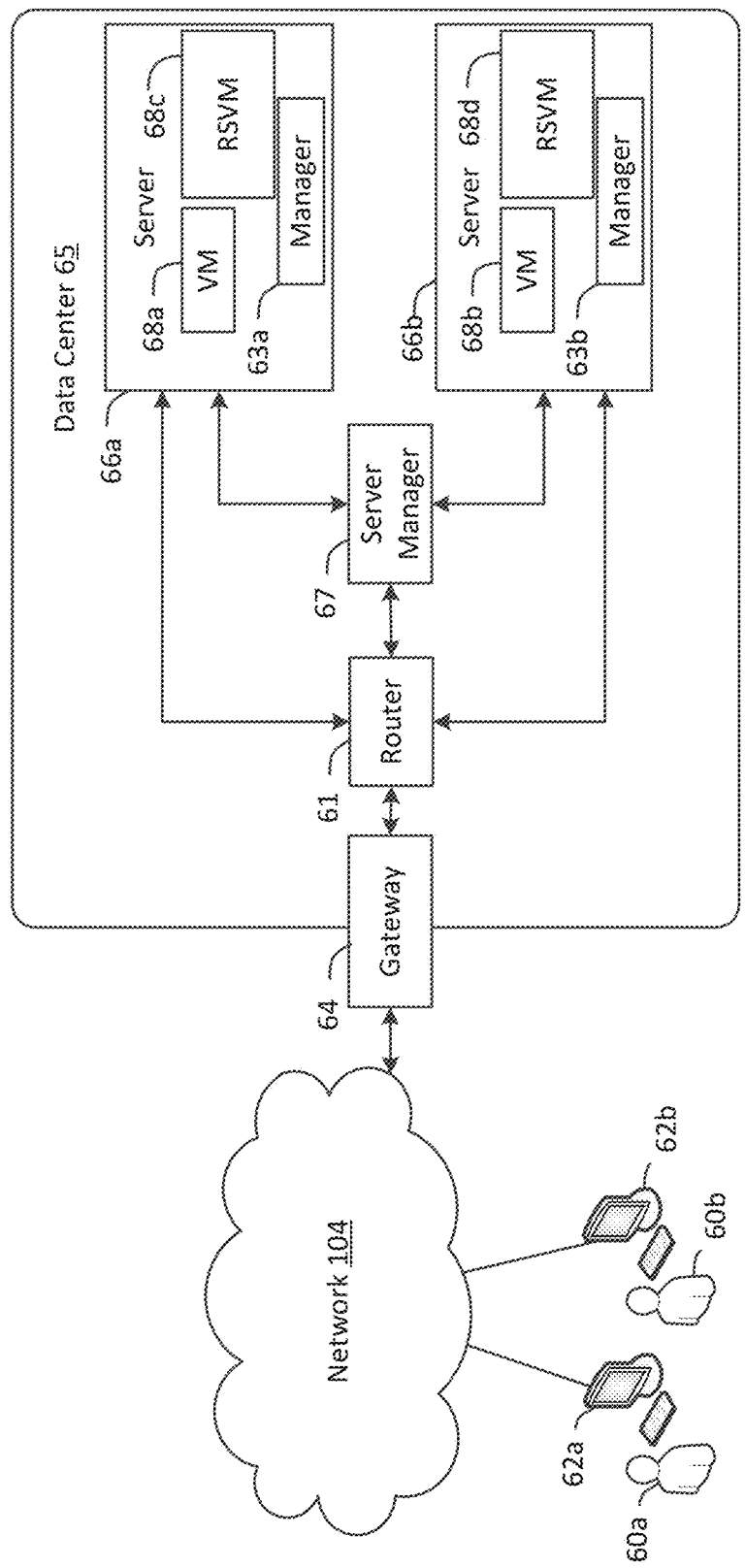
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide item filtering for a recipe interface as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various item filtering techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

FIG. 7 is an example graphical user interface 702 that may be used in accordance with various techniques described herein for iterative theme discovery. The example interface 702 includes selectable controls whereby a user may select the type of analysis to be performed by the various techniques described herein. For example, a user may select "Explore themes" if the user does not have a codebook and wants a codebook to be generated and/or used to tag input text with the themes of the codebook. In another example, "Contextual Themes" may be selected if the user is already in possession of a codebook (e.g., codebook 130 of FIG. 1, or similar). In various examples, the codebook used for "Contextual Themes" may be generated using the "Explore themes" techniques described herein. Contextual themes may allow the user to have input text data tagged using the student-teacher architecture described above using a user-supplied codebook. In another example, the user may select "Theme Search" to have input text tagged in accordance with the various techniques described above. As described herein, the "Theme Search" techniques may retrain the relevant models using the input text data that is to be tagged to create a customized search and tagging methodology for each user's unique purpose. Accordingly, the word and document embeddings (for both codebook keywords/keyphrases and the text of the document to be tagged) may be generated for the specific text corpus resulting in more accurate theme tagging.

As shown in the example interface 702 the user may enter the number of themes (e.g., topics) to be detected in the input text. In some examples, if the user does not select the number of themes, a default number of themes may be used. Interface 702 also includes a field allowing the user to upload a text corpus (e.g., "Select a file for analysis") and a field allowing the user to upload a codebook (e.g., "Select a file for the codebook"). It should be appreciated that the interface 702 is merely an example. Any desired interface may be used to provide a client-facing interface that may be used to perform the various iterative theme discovery techniques described herein. Additionally, the particular fields, graphical control elements, syntax, etc., of the interface may be different from what is shown in FIG. 7, depending on the desired implementation.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of discovering topics for text data, comprising:
receiving an input corpus of text data comprising a plurality of documents;
generating a codebook comprising a first number of topics, wherein each topic of the first number of topics is associated by the codebook with a corresponding set of keywords;
determining, for a first topic of the first number of topics, an average embedding of keywords associated with the first topic;
determining a distance in an embedding space between an embedding for a first document of the plurality of documents and the average embedding;
tagging the first document as pertaining to the first topic based at least in part on the distance;
receiving, from a first user, at least one edit to the codebook comprising at least one of adding a keyword, deleting a keyword, modifying a keyword, or re-naming a topic;
generating a modified codebook incorporating the at least one edit to the codebook;
inputting the modified codebook into a teacher model of a student-teacher machine learning model framework;
generating by a student model of the student-teacher machine learning model framework a probability that a second document corresponds to a second topic of the modified codebook; and
tagging the second document as pertaining to the second topic based at least in part on the probability.

2. The method of claim 1, wherein the student model comprises a transformer-based language model configured to generate an embedding representing the second document and a neural network-based classifier configured to classify text to different topics, and wherein the teacher model comprises a bag-of-words classifier that determines probabilities that a given document corresponds to a given topic of the modified codebook based on keywords of the modified codebook associated with the given topic.

3. The method of claim 1, further comprising:
receiving a second input corpus of text data;
retraining a language model based on the second input corpus of text data;
generating a first embedding for a document of the second input corpus of text data;
generating a second embedding for a keyword associated with a given topic of the modified codebook;
generating a third embedding for a contextual synonym of the keyword;
tagging the document of the second input corpus with the given topic based on a similarity between the first embedding and the second embedding or based on a similarity between the first embedding and the third embedding.

4. A method comprising:
receiving, by at least one computing device, first text data separated into a plurality of documents;
identifying, by the at least one computing device, a codebook comprising a first topic associated with a first set of keywords;
tagging a first document of the plurality of documents with the first topic based at least in part on the first set of keywords of the codebook;
receiving instructions to modify the codebook to generate a modified codebook, wherein the instructions are effective to add to, delete from, and/or modify at least one of the first set of keywords or the first topic;
tagging the first document of the plurality of documents with the first topic based at least in part on the first set of keywords of the modified codebook; and
generating output data indicating that the first document pertains to the first topic.

5. The method of claim 4, further comprising:
identifying candidate phrases among the first text data that include a noun and do not begin with a pre-defined stop word; and
generating a list of keywords that excludes phrases from the candidate phrases that are included in greater than a threshold percentage of the plurality of documents.

6. The method of claim 5, further comprising:
generating a respective first embedding for each keyword of the list of keywords using a language model; and
generating, using the language model, a respective second embedding for each document of the plurality of documents.

7. The method of claim 6, further comprising determining a score for a candidate keyword of the list of keywords based at least in part on a local cosine distance between the respective first embedding for the candidate keyword and the respective second embedding for the document from which the candidate keyword was extracted.

8. The method of claim 7, further comprising selecting the first set of keywords from the list of keywords based at least in part on a top N scores among the list of keywords.

9. The method of claim 8, further comprising using a clustering algorithm to cluster the first set of keywords into k clusters in an embedding space of each first respective embedding and each second respective embedding, wherein each cluster corresponds to a respective topic.

10. The method of claim 4, further comprising:
determining that the first document pertains to the first topic based on a distance in an embedding space between a first embedding for the first document and a second embedding pertaining to the first topic, wherein the first embedding and the second embedding are determined using a language model.

11. The method of claim 4, further comprising:
inputting the modified codebook into a teacher model of a student-teacher machine learning model framework; and
generating by a student model of the student-teacher machine learning model framework a probability that a second document corresponds to a second topic of the modified codebook.

12. The method of claim 11, wherein the student model comprises a transformer-based language model configured to generate an embedding representing the second document, and wherein the teacher model comprises a bag-of-words classifier that determines probabilities that a given document corresponds to a given topic of the modified codebook based on the first set of keywords of the modified codebook associated with the given topic, wherein the student model is trained based at least in part on the teacher model.

13. A system comprising:
at least one processor; and
non-transitory computer-readable memory storing instructions that, when executed by the at least one processor, are effective to:
receive first text data separated into a plurality of documents;

identify a codebook comprising a first topic associated with a first set of keywords;

tag a first document of the plurality of documents with the first topic based at least in part on the first set of keywords of the codebook;

receive instructions to modify the codebook to generate a modified codebook, wherein the instructions are effective to add to, delete from, and/or modify at least one of the first set of keywords;

tag the first document of the plurality of documents with the first topic based at least in part on the first set of keywords of the modified codebook; and generate output data indicating that the first document pertains to the first topic.

14. The system of claim 13, the non-transitory computer-readable memory storing further instructions that, when executed by the at least one processor, are further effective to:

identify candidate phrases among the first text data that include a noun and do not begin with a pre-defined stop word; and generate a list of keywords that excludes phrases from the candidate phrases that are included in greater than a threshold percentage of the plurality of documents.

15. The system of claim 14, the non-transitory computer-readable memory storing further instructions that, when executed by the at least one processor, are further effective to:

generate a respective first embedding for each keyword of the list of keywords using a language model; and generate, using the language model, a respective second embedding for each document of the plurality of documents.

16. The system of claim 15, the non-transitory computer-readable memory storing further instructions that, when executed by the at least one processor, are further effective to:

determine a score for a candidate keyword of the list of keywords based at least in part on a local cosine distance between the respective first embedding for the candidate keyword and the respective second embedding for the document from which the candidate keyword was extracted.

17. The system of claim 16, the non-transitory computer-readable memory storing further instructions that, when executed by the at least one processor, are further effective to select the first set of keywords from the list of keywords based at least in part on a top N scores among the list of keywords.

18. The system of claim 17, the non-transitory computer-readable memory storing further instructions that, when executed by the at least one processor, are further effective to use a clustering algorithm to cluster the first set of keywords into k clusters in an embedding space of each first respective embedding and each second respective embedding, wherein each cluster corresponds to a respective topic.

19. The system of claim 13, the non-transitory computer-readable memory storing further instructions that, when executed by the at least one processor, are further effective to determine that the first document pertains to the first topic based on a distance in an embedding space between a first embedding for the first document and a second embedding pertaining to the first topic, wherein the first embedding and the second embedding are determined using a language model.

20. The system of claim 13, the non-transitory computer-readable memory storing further instructions that, when executed by the at least one processor, are further effective to:

input the modified codebook into a teacher model of a student-teacher machine learning model framework; and generate by a student model of the student-teacher machine learning model framework a probability that a second document corresponds to a second topic of the modified codebook.

\* \* \* \* \*